3,047,402
FLUID SHORTENING
Werner H. Schmidt, Tenafly, N.J., assignor to Lever Brothers Company, New York, N.Y., a corporation of Maine
No Drawing. Filed Nov. 6, 1959, Ser. No. 851,250
5 Claims. (Cl. 99—118)

This invention relates to a fluid shortening composition. More particularly, the invention is concerned with a fat composition which is fluid so as to be pourable at the temperatures normally encountered in use and which can be used as a shortening for the preparation of baked goods including cakes. In addition, the composition of this invention is suitable for many other household applications, such as deep fat frying and the like. This application is a continuation-in-part of my co-pending application Serial No. 607,290, filed August 31, 1956, now abandoned.

At the present time, edible fats are generally marketed in one of three forms. By far the largest volume consumed is in the form of shortening which is solid or plastic at room temperatures. In addition, salad or "clear" oils, which have been prepared by "winterizing" liquid oils, such as cottonseed, soybean, olive, rapeseed, corn oil, and sunflower seed oil, are marketed for specific uses. Recently, fluid shortening compositions such as those described in United States Patent 2,815,286 to Andre et al. have appeared on the market.

The solid or plastic shortenings, particularly those of the superglycerinated type, perform exceptionally well in cake-making and other related uses. However, because they are solid or plastic at room temperatures, such shortenings are difficult to measure accurately. It has long been desired to provide fluid shortenings which are stable and pourable at room temperature, and which at the same time provide a high standard of performance in cake-baking.

The salad oils remain clear and pourable, even at refrigerator temperatures, but with the exception of a few specific varieties of cakes, are not suitable for use in cake-making. The salad oils cannot be used in the preparation of conventional high volume cakes containing a high ratio of sugar to flour.

The fluid shortening compositions presently on the market fall somewhere between the plastic shortenings and salad oils in their characteristics. Generally speaking, the quality of the cakes prepared with fluid shortenings represent an improvement over those prepared with salad oils. Present-day fluid shortening compositions do not, however, provide baked products and particularly high-ratio cakes of a quality equal to those prepared with superglycerinated plastic shortenings.

An additional defect of present-day fluid shortening compositions is their tendency to firm or solidify after heating to frying temperatures and subsequent cooling. Such shortcomings generally contain a small amount of saturated glycerides, particularly saturated monoglycerides, in order to improve their baking performance. These solids originally are suspended in the liquid base oil as small beta phase crystals by special process conditions. Heating such oils to frying temperatures melts these crystals and subsequent cooling in the home permits the formation of a large proportion of the undesirable alpha and beta-prime crystals which cause solidification of the fat.

It is, therefore, an object of the present invention to provide an all-purpose fluid shortening which provides results in cake-baking which are equivalent to the results obtained with conventional superglycerinated plastic shortenings.

Another object of the invention is to provide an all-purpose fluid shortening which is homogeneous, stable and pourable at temperatures normally encountered in use and which at the same time may be heated to temperatures as high as 350–380° F., i.e., temperatures used for deep fat frying, and thereafter cooled to room temperature without solidification or "firming" taking place on cooling.

These and other objects of this invention will be apparent from the following description of the invention.

I have discovered that an improved fluid shortening composition meeting the above objects can be obtained by providing an edible liquid oil base having dispersed therein as a stable suspension, from 3 to 4% by weight, preferably about 3.5% by weight, of finely divided solid fats. The solid fats are substantially fully saturated glycerides of fatty acids having from 12 to 20 carbon atoms. The saturated glycerides should include diglycerides, from about 1% to about 2% by weight of the shortening of monoglycerides, and from 0.0% to about 0.5% by weight of the shortening of triglycerides. The weight ratio of saturated diglycerides to saturated monoglycerides in the shortening must be at least 1:1 and not greater than 3:1. In addition, the fatty acid content of the saturated glycerides comprises from about 22% to about 42% palmitic acid. The weight ratio of saturated diglyceride to saturated monoglyceride is preferably 2:1.

The fluid shortening compositions of this invention are in the form of a stable suspension of the saturated fatty glycerides in the edible liquid oil base. This suspension is formed by mixing the liquid oil and the saturated glycerides and heating the mixture to a temperature at which the system is fluid, e.g., 130–160° F.

For small scale batch operation, i.e., batches of about 3 pounds, the blend is allowed to cool by standing in a room at 70° F. for about 16 hours. Thereafter, the batch may optionally be homogenized at 70° F. and further "conditioned" by standing without agitation at 70° F. for about 24 hours.

For large scale or continuous operation, the melted blend is chilled in a "Votator" A unit to the crystallization point, a temperature of about 86–90° F. After de-aeration, this stock is then tempered (standing without agitation) at about 90° F. for 2 days. In order to have the desired fluidity, the viscosity of the blend should not be greater than 5000 centipoise as measured on a Brookfield viscosimeter at 70° F. using a No. 3 spindle at 12 r.p.m. It is preferred that the compositions have a viscosity not greater than 4000 centipoises. These conditions are maintained for the purpose of providing a composition which will be pourable in the temperature range of 60–90° F.

The edible liquid oil base used according to this invention may be any liquid vegetable oil such as cottonseed, soybean, corn, safflower oil, olive and peanut oils, among other. Slightly hydrogenated liquid variations may also be employed. It is important, however, that the edible liquid oil base contain a minimum level of saturated triglycerides that are solid at 85°–100° F. Ordinary refined and deodorized cottonseed oil generally contains in the order of 0.1% of saturated triglycerides and is an excellent base oil for use in the compositions of this invention. The importance of this requirement will be more fully discussed below in relation to the total saturated triglyceride limitation.

The mixture of glycerides of saturated higher fatty acids used in the fluid shortening compositions of this invention may be prepared by procedures discussed in detail hereinafter from materials such as vegetable oil stearines. Examples of suitable stearines include those of palm oil, lard oil and cottonseed oil. The fatty acid component of the saturated glyceride mixture should contain from about 22% to about 42% of the palmityl ($C_{15}H_{31}COO$)

group. In addition, the mixture may contain other saturated fatty acids having from 12 to 20 carbon atoms. Thus, a preferred source of the mixture of mono- and diglycerides of saturated fatty acids includes hydrogenated cottonseed winter oil stearine the fatty acid composition of which is about 37% palmitic acid and about 63% stearic acid.) An additional suitable source is lard oil, the fatty acid composition of which includes about 25% palmitic acid. Substantially fully hydrogenated palm oil (about 42% palmitic acid) and cottonseed oil (about 22% palmitic acid) may also be used as a source of the mixture of mono- and diglycerides of saturated fatty acids.

Fully hydrogenated soybean oil, on the other hand, is not a suitable source of saturated glycerides. This material has only about 10% palmitic acid and imparts less than satisfactory cake-making ability. However, by increasing the palmitic acid content of this material to the range given above by mixing therewith a fully saturated palmitic acid triglyceride, a suitable source is provided. The mixture of glycerides, or the oils from which they are derived, is preferably hydrogenated to an iodine value of 30 or less.

The saturated glyceride mixtures containing from about 22% to about 42% of palmitic acid in the fatty acid component thereof are believed to account for the unexpectedly improved results obtained when the shortenings of this invention are employed in the preparation of high-ratio cakes. The production of cakes of consistently high quality is an important characteristic of any household shortening. This characteristic is assured in the shortenings of this invention by employing saturated glycerides, the fatty acid portions of which have a palmitic acid content within the aforementioned range.

The amount of saturated triglycerides employed in the shortenings of this invention is critical to the maintenance of a low viscosity. Furthermore, compositions containing more than about 0.5% of saturated triglycerides, taking into account both the saturated triglyceride content of the base oil and those added with the saturated glycerides, are subject to undesirable solidification after heating and subsequent cooling.

Thus, according to this invention, both the palmitic acid and the saturated triglyceride content of the fluid shortening must be carefully regulated to provide an excellent shortening for cake preparation, and, at the same time, provide a readily pourable fluid shortening which will not solidify on heating to frying temperatures and subsequent cooling.

The saturated glyceride mixture employed according to this invention may be prepared by manufacturing or purchasing each of the ingredients separately and mixing them in the desired ratio. A preferred method for preparing such a mixture employs a stearine of an oil which has a fatty acid content containing 12 to 20 carbon atoms and is as follows: 40 parts by weight of cottonseed winter oil stearine or other suitable stearine is mixed with 11 parts by weight of 95–98% glycerine and a small quantity of sodium hydroxide (e.g., 0.04 to 0.05 part by weight). The mixture is reacted under reflux conditions for 2 hours at 210° C., using either steam at subatmospheric pressure or nitrogen at a slight positive pressure for agitation. Mechanical means may also be employed to supply all or part of the agitation. After the esterifying conditions have been maintained for 2 hours the alkaline catalyst (soap) is removed by adding 0.1 part of 75% phosphoric acid. Other acids may be used, but phosphoric acid is preferred, because the insoluble phosphates may be removed by filtration. The reaction mixture may be acidified by adding a slight excess of the acid.

The temperature of the reaction mixture is lowered to 180° C., vacuum is applied and the reacted glycerine is removed by steam distillation. At the beginning of this "deglycerination step," the mixture contains some free glycerine, about 50–55% monoglycerides, about 45% diglycerides and small amounts of triglycerides. After distilling the mixture for 75 minutes, virtually all free glycerine has been distilled off and the mixture consists of about 47.5% monoglycerides, 47.5% diglycerides, and the balance triglycerides. This is considered a normal mixture of saturated monoglycerides, diglycerides and triglycerides generally sought in commercial practice.

The injection of steam, however, is continued at a temperature above 125° C. so as to split some of the monoglycerides into diglycerides and free glycerine, the latter being distilled off as fast as it is formed. Below 150° C. the splitting may be slow, and hence it is preferred to operate at above about 150° C. At temperatures above 200° C. the conversion of monoglycerides to diglycerides occurs so rapidly that it may be difficult to stop the reaction at the desired end point. Above 225° C. the formation of polyglycerides is likely to occur, resulting in undesirable characteristics from the standpoint of baking qualities. The deglycerination period is continued for a total of 150 minutes at 180° C. and 2–7 mm. of mercury absolute pressure. At this time the ester mixture has a composition of approximately 30% monoglycerides, 65% diglycerides and 5% triglycerides. This is a desirable product for use in the fluid shortening of this invention.

The shortenings of this invention have been evaluated in terms of their cake-making ability. Cake ingredients may be combined in any one of several ways. One of the oldest and perhaps most common is to first mix or "cream" the shortening and sugar, following by addition of eggs and then alternate portions of flour and milk, the salt and baking powder being with the flour. This is called the creaming method and is described in greater detail below.

The next most common method is to first mix the shortening and flour followed by the sugar and then the eggs and milk together. This is the so-called "blending" method, and is also described in greater detail below.

Other ingredient addition orders are possible but regardless of the mixing method it is necessary that the fat particles in the final batter (which is an oil-in-water type emulsion) shall contain small air bubbles. The volume of the final cake can be varied by the amount of baking powder added but unless these air bubbles of microscopic size are present in the fat phase of the batter, the cake will be coarse grained, tough crusted and hard textured.

When the creaming method is used, the air bubbles in the batter are large and the batter volume, which is the reciprocal of the specific gravity, is high if the cake is to be good. When the blending method is used, the air bubbles in the batter are smaller and the batter volume has less significance although some aeration of the batter in mixing is fully as important. Proper aeration of the batter is reflected in higher cake volumes. In the case of the creaming method, there is a fairly good correlation between batter volume and cake volume. In the blending method, fineness rather than degree of aeration is most important and correlation between batter volume and cake volume is less significant. This function of air in batter fat is well known to the art and is discussed extensively in Alton E. Bailey, Industrial Oil and Fat Products, 2nd Edition (1951), Interscience Publishers, at pages 295–304, and in an article by G. T. Carlin published in Cereal Chemistry, vol. 21, pages 189–199 (1944).

Different laboratories and bakeries vary considerably in their methods of expressing their judgments of cakes. Whatever evaluation method is used, the characteristics desirable in cakes are generally recognized in industry and in the home. Descriptions of cake scoring methods may be found, for example, in the article by O. E. Stamberg in Cereal Chemistry, vol. 16, page 764 (1939), and the article by F. Hanning in Cereal Chemistry, vol. 29, page 177 (1952). In this laboratory cakes are scored on the basis of crust, grain, and texture. Crust ratings are very tender, tender, medium tender, slightly tough, and tough. Grain ratings are even, very slightly uneven, slightly uneven and uneven, in any combination with open, slightly open, very slightly open, close, very slightly tight, slightly tight or tight. Texture ratings are soft, medium soft, medium hard and hard. An all-hydrogenated super-glycerinated plastic vegetable shortening may be expected to yield a cake having a tender crust, an even close grain, and soft texture.

The following chart was employed in scoring the layer cakes evaluated in the examples which follow.

LAYER CAKE SCORING CHART

| Cake volume (30) | | Grain (30) | |
|---|---|---|---|
| Yellow layers | White layers | | |
| 1200 — 30 | 1100 — 30 | Even—Close | 30 |
| 1175 — 27 | 1075 — 25 | V. sl. uneven—Close | 28 |
| 1150 — 24 | 1050 — 20 | Even—V. sl. coarse | 28 |
| 1125 — 21 | 1025 — 15 | Sl. uneven—Close | 27 |
| 1100 — 18 | 1000 — 10 | Even—Sl. coarse | 26 |
| 1075 — 15 | | Uneven—Close | 24 |
| 1050 — 12 | | Sl. uneven—Sl. Coarse | 22 |
| 1025 — 9 | | Even—V. sl. tight | 21 |
| 1000 — 6 | | Sl. uneven—V. sl. tight | 20 |
| | | Uneven—Sl. coarse | 18 |
| | | Sl. uneven—Sl. tight | 16 |
| | | Even—Sl. tight | 14 |
| | | Even—Coarse | 14 |
| | | Uneven—Sl. tight | 12 |
| | | Uneven—Coarse | 12 |
| | | Even—Tight | 5 |
| | | Coarse—Bready | 3-6 |

| Texture (10) | | Crust (10) | |
|---|---|---|---|
| Soft | 10 | Tender | 10 |
| Med. soft | 7-9 | Med. tender | 7-9 |
| Med. hard | 4-6 | Sl. tough | 4-6 |
| Hard | 1-3 | Tough | 1-3 |

| Symmetry of form (10) | | Eating quality (10) | |
|---|---|---|---|
| Full round | 10 | Short—Tender | 10 |
| Sl. flat top | 6-8 | Med.—"Med." | 7-9 |
| Flat top | 4-6 | Sl. tough | 4-6 |
| Peaked | 4-6 | Sl. gummy | 4-6 |
| Sl. sunken center | 2-4 | Tough | 1-3 |
| Sunken center | 0-2 | Gummy | 1-3 |

The "blending" method designated above for testing cake-making capacity is carried out as follows:

| Formula | Yellow cake | | White cake | |
|---|---|---|---|---|
| | Grams | Volume | Grams | Volume |
| Flour—"Softasilk" | 200 | 2 cups | 200 | 2 cups. |
| Sugar—"Fruit-fine" | 265 | 1⅓ cups | 250 | 1¼ cups. |
| Baking powder—"Calumet" | 10 | 2½ tsp | 14 | 3½ tsp. |
| Salt | 4 | 1 tsp | 4 | 1 tsp. |
| Shortening | 100 | ½ cup | 100 | ½ cup. |
| Whole milk | 210 | 1 cup less 2 tbsp. | 210 | 1 cup less 2 tbsp. |
| Eggs (fresh) | 100 | 2 (whole) | 90 | 3 egg whites. |
| Vanilla | 6 | 1½ tsp | 6 | 1½ tsp. |

Sift flour, sugar, baking powder and salt into mixing bowl. Add shortening, vanilla and two-thirds of the milk. Beat 2 minutes in electric mixer (Sunbeam "Mixmaster") at No. 4 speed. Scrape bowl and beater with a flexible rubber spatula. Add eggs and remaining milk and mix 2 minutes at No. 4 speed. Again scrape and mix. Take batter volume. Split batter into each of two paper-lined and greased 8-inch layer cake tins. Bake yellow cakes at 375° F. for 24 minutes; 22 minutes at 375° F. for white cakes. Take cake volumes by standard method and score the day after the cakes are baked.

The "creaming" method for making test cakes is carried out as follows:

| Formula | Grams | Volume measure |
|---|---|---|
| Flour—"Softasilk" | 200 | 2 cups. |
| Sugar—"Fruit-fine" | 200 | 1 cup. |
| Baking powder—"Calumet" | 10 | 2½ tsp. |
| Salt | 3 | ½ tsp. |
| Shortening | 100 | ½ cup. |
| Whole milk | 180 | ¾ cup. |
| Eggs (fresh) | 100 | 2 (whole). |
| Vanilla | 4 | 1 tsp. |

Cream sugar, salt and shortening 2 minutes in electric mixer (Sunbeam "Mixmaster") on No. 4 setting. Scrape bowl and add eggs. Mix 2 minutes on No. 4 setting and scrape bowl. Add one-half of the milk, then sifted flour and baking powder and mix smooth. Add balance of milk, flour and mix 1½ minutes. Take batter volume. Split batter into two 8-inch greased layer cake pans. Bake approximately 23 minutes at 375° F. Take cake volume and score the day after the cakes are baked.

My invention will be illustrated by the following examples using the standard test cake mixes as set forth above.

EXAMPLE 1

Liquid shortenings were prepared by mixing saturated glyceride mixtures available on the market which had been prepared from hydrogenated lard (containing 26% of glycerides of palmitic acid) with refined and bleached liquid cottonseed oil in the ratios set forth in Table I and in batches of 3 pounds each, using the batch mixing and cooling process described above. The total amount of saturated glycerides added in each case was 3.5% based on the total blend except for Formula No. 6, which contained none. Layer cakes were prepared by the 2-egg creaming method heretofore described using the fluid shortenings. The level of saturated triglycerides given in the table is based on the complete shortening. Viscosity measurements were made on the liquid shortening and these values also are presented in Table I.

Table I

| Formula No. | Di-/mono weight ratio | Percent tri. | Apparent viscosity at 70° F.[1] | | |
|---|---|---|---|---|---|
| | | | As made, cps. | After 3 days at 105° F., cps. | After melting, cps. |
| 1 | 0/1 | .1 | 2,430 | 1,320 | 2,300 |
| 2 | 1/2 | .1 | 4,460 | 4,020 | 3,150 |
| 3 | 1/1 | .1 | 4,060 | 3,180 | 3,100 |
| 4 | 2/1 | .1 | 1,970 | 2,620 | 290 |
| 5 | 3/1 | .1 | 1,890 | 4,280 | 380 |
| 6 | | .1 | 70 | 70 | 70 |

[1] Determined with Spindle #3, 12 r.p.m. on Brookfield viscosimeter LVF Ser. No. 7645, range 0–10,000 cps.

The batter and cake volumes were measured, as well as the grain, texture and crust of the cakes. The results of these observations are presented in Table II.

Table II

| Formula No. | Batter volume, cc./gm. | Cake volume, cc. | Grain | Texture | Crust | Cake scores |
|---|---|---|---|---|---|---|
| 1 | 0.95 | 1,155 | Sl. coarse | M. soft | M. tender | 80 |
| 2 | 1.01 | 1,160 | do | do | do | 81 |
| 3 | 1.03 | 1,190 | do | Soft | Tender | 91 |
| 4 | 0.99 | 1,175 | do | do | do | 90 |
| 5 | 0.98 | 1,185 | do | do | do | 90 |
| 6 | 0.93 | 1,065 | Uneven coarse | Hard | Tough | 50 |

Example 1 shows that substantially improved and unexpected cake-making results are obtained consistent with fluidity of the shortening using a mixture of saturated diglycerides and monoglycerides in the fluid shortening in the ratio of from 1:1 to 3:1, preferably 2:1. It should also be noted that the level of saturated triglycerides in each instance is below 0.5%, and that each composition is of a pourable consistency.

EXAMPLE 2

Using the same fluid shortenings as in Example 1, yellow layer cakes were made using the 2-egg blending method described heretofore. The results of the cake quality measurements and observations are presented in Table III.

*Table III*

| Formula No. | Batter volume, cc./gm. | Cake volume, cc. | Grain | Texture | Crust | Cake scores |
|---|---|---|---|---|---|---|
| 1 | 0.90 | 1,220 | Uneven sl. coarse. | M. soft | Tough | 79 |
| 2 | 0.94 | 1,260 | ---do--- | ---do--- | ---do--- | 79 |
| 3 | 0.94 | 1,265 | ---do--- | Soft | M. tender | 88 |
| 4 | 0.93 | 1,265 | ---do--- | ---do--- | ---do--- | 88 |
| 5 | 0.93 | 1,265 | ---do--- | M. soft | Sl. tough | 83 |
| 6 | 0.94 | 1,205 | Even coarse | M. hard | Tough | 62 |

Example 2 shows that the same ratio of di- to mono-glycerides in the fluid shortening that were found to be effective in cake-making by the "creaming" method apply also to making cakes by the "blending" method.

EXAMPLE 3

A mixture of saturated glycerides was prepared from cottonseed winter oil stearine, hydrogenated to an iodine value of 1, by esterifying the hydrogenated oil to give approximately 30% monoglycerides, 65% diglycerides and 5% triglycerides by the procedure described above. The fatty acid portion of the composition contains about 35% palmitic acid. In different tests, various amounts of this mixture were added to liquid refined and deodorized cottonseed oil to prepare fluid shortenings which then were used to prepare cakes by the 2-egg creaming method heretofore described. All of the shortening samples were mixed by the continuous process described above using the "Votator" A unit, then packed in containers at 89° F., then tempered for 2 days at 89° F. and conditioned at 70° F. before being used in the cake-baking tests. The results of viscosity and cake-baking quality measurements are presented in Table IV.

*Table IV*

| Percent triglyceride | Percent saturated glyceride emulsifier | Apparent viscosity at 70° F. cps. | Batter volume, cc./gm. | Cake volume, cc. | Grain | Texture | Crust | Cake scores |
|---|---|---|---|---|---|---|---|---|
| .250 | 3.00 | 755 | 1.12 | 1,145 | Sl. uneven sl. coarse | M. soft | M. tender | 79 |
| .275 | 3.50 | 1,770 | 1.25 | 1,190 | ---do--- | Soft | Tender | 90 |
| .288 | 3.75 | 4,450 | 1.17 | 1,200 | Uneven sl. coarse | M. soft | M. tender | 88 |
| .300 | 4.00 | 4,400 | 1.20 | 1,200 | Sl. uneven sl. coarse | ---do--- | ---do--- | 88 |

The data in Table IV show that at a ratio of di- to monoglyceride of about 2:1, the optimum fluidity and baking balance occurs at 3.5% content of the mono- and diglycerides.

EXAMPLE 4

A series of fluid shortenings were prepared containing 96.5% of refined and deodorized liquid cottonseed oil (CSO) and 3.5% of various mixtures of saturated glycerides in which the ratio of saturated diglycerides to saturated monoglycerides was 2:1. The base-stocks used to prepare the saturated glyceride mixtures included the following fully hydrogenated fats: soybean oil (SBO), cottonseed oil (CSO), cottonseed winter oil stearine (CSWOS), palm oil (PO), and palmitic acid. The palmitic acid contents of these glyceride mixtures were 10, 22, 35, 42 and 90%, respectively. The fluid shortenings were prepared in 3 pound batches using the batch-mixing and cooling process described above. In each instance, the saturated triglyceride content of the shortening was .2%. Each of these shortenings was then tested in the normal baking tests described above, and the results were scored following the procedure set forth in the scoring chart given above. The average results of two bakings for each value is given in the following table.

*Table V*

TWO-EGG YELLOW BLENDING TYPE LAYER CAKE

| | SBO | CSO | CSWOS | PO | Palmitic acid |
|---|---|---|---|---|---|
| Palmitic acid | 10% | 22% | 35% | 42% | 90% |
| Batter volume [1] | 0.93 | 0.96 | 1.03 | 1.03 | 0.99 |
| Cake volume [2] | 1,170 | 1,165 | 1,220 | 1,220 | 1,190 |
| Score | 76 | 77 | 91 | 91 | 80 |

TWO-EGG YELLOW CREAMING TYPE LAYER CAKE

| Batter volume [1] | 1.02 | 1.03 | 1.16 | 1.05 | 0.96 |
| Cake volume [2] | 1,075 | 1,110 | 1,190 | 1,140 | 1,040 |
| Score | 53 | 69 | 91 | 74 | 43 |

[1] Batter volume, cc./gram.
[2] Cake volume, cc./layer.

It can be seen from Table V that optimum baking results are obtained when the palmitic acid content of the saturated glycerides present in the shortenings of this invention is about 35%. With the yellow cakes prepared by the creaming method, cakes of good quality were obtained over the range of about 22% to about 42% of palmitic acid. Where the blending method was employed, fair results were obtained over the entire range of 10 to 90%. In order to obtain consistently good performance, however, regardless of the method employed in preparing the cake, a palmitic acid range of 22% to 42% should be employed.

Fluidity of all of the shortenings given above was within the acceptable range.

EXAMPLE 5

A number of fluid shortening samples were prepared containing varying amounts of saturated triglycerides. The shortenings were prepared in 3 pound amounts, according to the batch method set forth above. They were based on refined deodorized cottonseed oil to which was added solid saturated glycerides obtained from cottonseed winter oil stearine hydrogenated to an iodine value of 1. The viscosity of each of the fluid shortenings after crystallization at 70° F. was determined. From this viscosity determination, the behavior of the product after it is melted for deep frying and then cooled as in normal household use can be predicted. The results of these tests are given in the following table.

*Table VI*

THE EFFECT OF SATURATED GLYCERIDE COMPOSITION ON THE VISCOSITY OF FLUID SHORTENINGS

| Sample No. | Composition of saturated glyceride added, basis shortening | | | Percent solids added as saturated glycerides | Percent saturated triglycerides in shortening | Viscosity at 70°F. after crystallization at 70°F. (cps.) |
|---|---|---|---|---|---|---|
| | Percent mono- | Percent di- | Percent tri- | | | |
| 1 | 1.05 | 2.28 | 0.17 | 3.50 | 0.27 | 2,330 |
| 2 | 1.11 | 2.40 | 0.18 | 3.69 | 0.28 | 4,050 |
| 3 | 1.17 | 2.54 | 0.20 | 3.91 | 0.30 | 4,310 |
| 4 | 1.25 | 2.70 | 0.20 | 4.15 | 0.30 | 4,920 |
| 5 | 1.05 | 2.28 | 0.36 | 3.69 | 0.46 | 5,040 |
| 6 | 1.05 | 2.28 | 0.58 | 3.91 | 0.63 | 6,240 |
| 7 | 1.05 | 2.28 | 0.82 | 4.15 | 0.82 | 7,600 |

In Table VI, above, the saturated glycerides were obtained from hydrogenated cottonseed winter oil stearine having an iodine value of 1. Sample 1 resulted from the addition to liquid refined deodorized cottonseed oil of the indicated amount of the saturated glycerides. Samples 5 to 7 show the result of increasing the triglyceride content while maintaining the mono- and di-glyceride content constant. Samples 2–4 are included for comparison, and show the increase in viscosity due to solids increase from mono- and di-glycerides, the triglyceride level remaining constant.

For satisfactory pourability, the viscosity of the product should be below about 5000 centipoises. This same criteria applies to fats which can be melted and then cooled without undesirable solidification at room temperature. It can be seen from the results of this test that fluid shortenings containing saturated triglycerides at a level of less than about 0.5% must be employed in order to provide the desired pourability, both initially and after heating and subsequent cooling.

It is understood that the foregoing examples are illustrative only and that modifications will occur to those skilled in the art. Therefore, the invention is not to be limited thereto but is to be defined by the appended claims.

I claim:

1. A fluid shortening composition consisting essentially of an edible oil base having, in stable suspension therein, from about 3% to about 4% of finely divided substantially fully saturated glycerides of fatty acids having from 12 to 20 carbon atoms, the saturated glycerides including diglycerides, from about 1% to about 2% by weight of the shortening of monoglycerides and from 0.0% to about 0.5% by weight of the shortening of triglycerides, the said diglycerides and monoglycerides being present in the shortening in a weight ratio of at least 1:1 and no greater than 3:1, and the fatty acid complement of said saturated glycerides comprising from about 35% to about 42% of palmitic acid.

2. The composition as described in claim 1 wherein the weight ratio of diglycerides to monoglycerides is about 2:1.

3. The composition of claim 2 wherein the saturated glycerides are present in the composition at a level of about 3.5%.

4. The composition of claim 1 wherein the edible liquid base oil is refined cottonseed oil.

5. The composition of claim 1 wherein the mixture of saturated glycerides is obtained from cottonseed winter oil stearine.

References Cited in the file of this patent

UNITED STATES PATENTS

| | | |
|---|---|---|
| 2,532,523 | Trempel et al. | Dec. 5, 1950 |
| 2,773,771 | Julian et al. | Dec. 11, 1956 |
| 2,815,286 | Andre et al. | Dec. 3, 1957 |